United States Patent [19]

Walker

[11] Patent Number: 4,546,993
[45] Date of Patent: Oct. 15, 1985

[54] ADJUSTABLE MOTORCYCLE PASSENGER FLOORBOARD

[76] Inventor: George R. Walker, 2897 Palma Dr., Ventura, Calif. 93001

[21] Appl. No.: 541,601

[22] Filed: Oct. 13, 1983

[51] Int. Cl.$^4$ ............................................. B62J 25/00
[52] U.S. Cl. ..................................... 280/291; 182/91; 248/284; 280/166; 296/75; 403/4; 403/234
[58] Field of Search ............... 280/291, 289 R, 289 G, 280/289 E, 163, 164 R, 165, 166, 301, 303; 403/234, 235, 191, 4, 359; 248/284; 296/75; 182/89, 90, 91, 92, 97, 98

[56] References Cited

U.S. PATENT DOCUMENTS

| | | | |
|---|---|---|---|
| 1,118,679 | 11/1914 | Pawsat | 280/291 |
| 1,125,281 | 1/1915 | Fentress | 280/291 |
| 2,218,060 | 10/1940 | Watson | 280/165 |
| 4,174,852 | 11/1979 | Panzica et al. | 280/291 |

FOREIGN PATENT DOCUMENTS

| | | | |
|---|---|---|---|
| 474881 | 10/1952 | Italy | 280/291 |
| 276167 | 8/1927 | United Kingdom | 280/291 |

Primary Examiner—Joseph F. Peters, Jr.
Assistant Examiner—Mitchell J. Hill
Attorney, Agent, or Firm—Jessup, Beecher & Slehofer

[57] ABSTRACT

An adjustable motorcycle passenger floorboard is attached at either side of a motorcycle frame below the rear seat. The device has a cylindrical rail having a brace at either end. The braces have slotted bolt holes for allowing the device to be bolted to the frame. A split clamp is attached around the cylindrical rail. The clamp, when loosened, can be slid between the braces of the cylindrical rail for allowing a continuous adjustment of the floorboard. The floorboard is attached to the clamp by a bar which can be rotated about its axis in a notched recess in the clamp for adjusting the attitude of the floorboard relative to the motorcycle. There are two adjustments in the device; one for adjusting the floorboard in a fore and aft position relative to the frame, and the other for adjusting the attitude or rake of the floorboard relative to the frame.

2 Claims, 5 Drawing Figures

ADJUSTABLE MOTORCYCLE PASSENGER FLOORBOARD

SUMMARY OF THE INVENTION

The invention is an adjustable passenger floorboard, one for each side of the frame of the motorcycle so that the passenger sitting on the rear seat on the motorcycle has a safe place to rest his/her feet. Since people are of different heights and the distance between the rear seat and the floorboard can vary from motorcycle to motorcycle, the need to fine tune or adjust the floorboard is necessary with these passenger floor boards. Rear passenger floorboards are known in the art but they require a plurality of bolt patterns on the motorcycle frame. The adjustment of the floorboard has been done in steps rather than a continuous fashion. The present invention also discloses slotted bolt holes so that a plurality of motorcycle bolt patterns can be utilized so that one adjustable floorboard can be used with a variety of motorcycles. The platform has an adjustable split clamp so that it can be loosened to allow the platform to be slid back and forth the distance between the ends of the frame means to provide an infinite number of adjusting positions. After the correct adjustment is obtained, the adjustable clamp is simply tightened down to keep it in one place. The floorboard extends perpendicular from the travel path of the adjustable clamp on the frame means. A rigid bar is attached between the floorboard and the clamp means. The floorboard is pivotally connected to the outer end of the bar so that the floorboard can be pivoted up and away when not in use. When in use it is pivoted down to a horizontal position and there is a stop means between the bottom of the floorboard and the bar so that the floorboard can never pivot below the bar. The bar is removably attached to the adjustment clamp and can be unbolted and simply rotated in a plane about its axis. This will change the horizontal attitude of the floorboard. In other words, the floorboard can be put in a more vertical position or a more horizontal position by this one adjustment. In summary, there are 2 adjustments to the floorboard. The first adjustment is the clamping means which allows for the sliding of the floorboard along the lines of the rail means to increase or decrease the distance between the passenger and the floorboard; and two, the floorboard itself can be rotated in an axis perpendicular to the path and the adjustment of the adjusting clamp changing the attitude of the floorboard relative to the motorcycle. Accordingly, it is the object of this invention to disclose an adjustment to the floorboard having two separate and independent adjustment factors. Secondly, it is another object of this invention to disclose an adjustable clamping means so that the floorboard can be adjusted in a continuous manner along the length of the rail means attached to the motorcycle.

DETAILED DESCRIPTION OF THE PREFERRED EMBODIMENT

Figure 1:
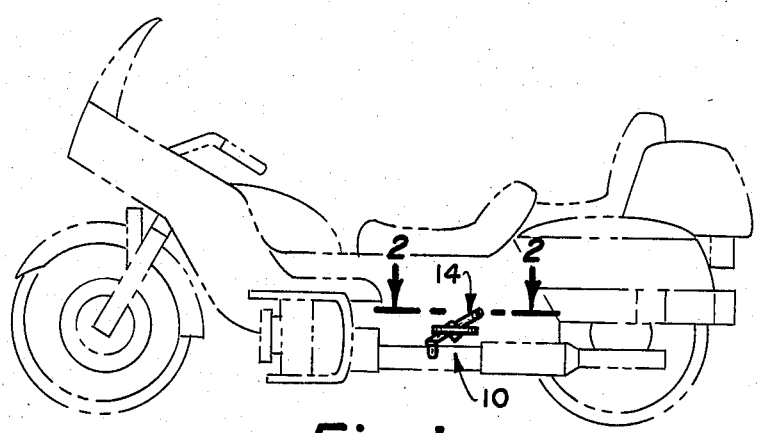
FIG. 1 discloses an elevational view of the left side of the motorcycle indicated in phantom lines and showing the approximate placement of the adjustable floorboard on the motorcycle.

Referring now to the drawings, FIG. 1 discloses a side-view of a motorcycle shown in phantom lines, and generally showing the position of the floorboard 10 on the motorcycle.

Figure 2:
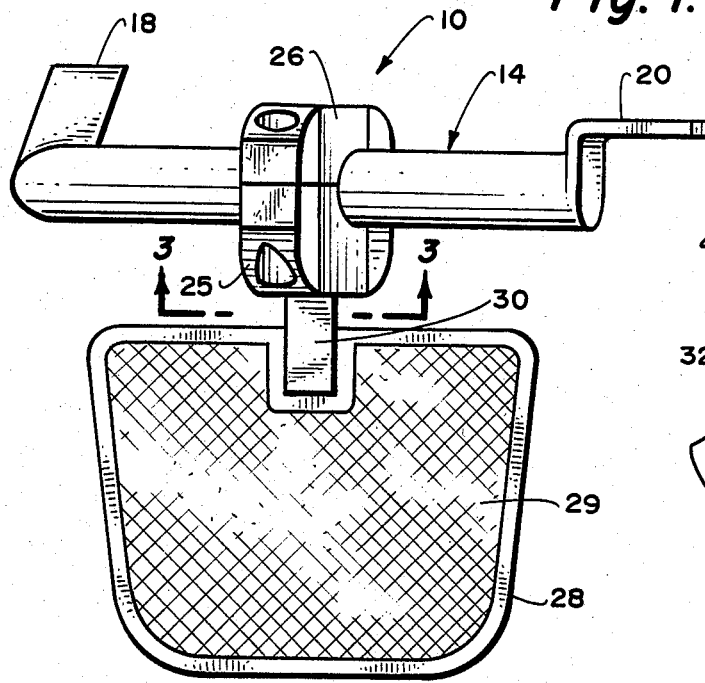
FIG. 2 is a top plan view taken along the lines of 2—2 of FIG. 1 showing the adjustable floorboard.

FIG. 2 is a top-plan view of the entire floorboard assembly 10. There is a rail support means provided by a cylindrical piece of tubing 14 and having a first brace 18 welded to the front end of the tubing 14; and a second brace welded to the rear end of the tubing 14. The tubing 14, and the two braces 18 and 20 comprise the rail support means.

Figure 4:
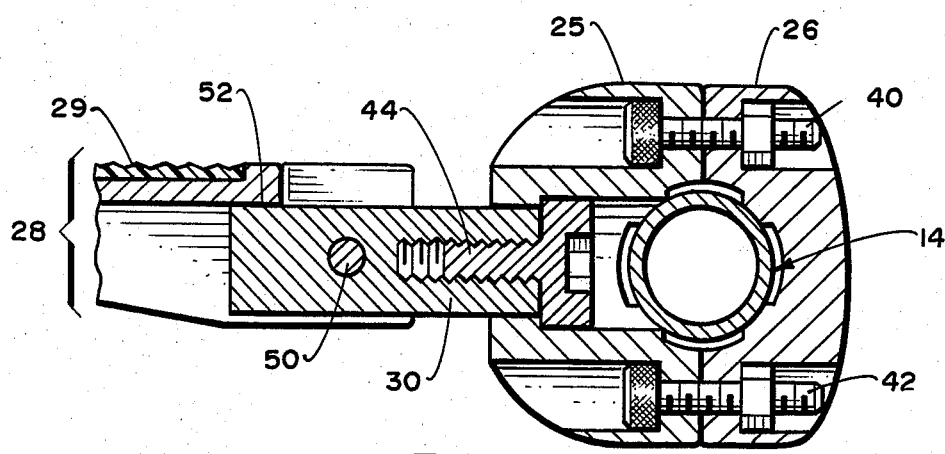
FIG. 4 is a cross-sectional view taken along the lines 4—4 of FIG. 3 showing the 2 halves of the adjustable clamp means clamped around the rail means, the bar attached to the clamp means and extending from the clamp means, the floorboard in the open horizontal position.

There is an adjustable clamping means, the cross-section of which is disclosed in FIG. 4. The clamping means is in the form of a split clamp having two halves. The exterior clamp 25 and interior clamp 26, when mated, create a passageway for allowing a slideable movement along the tubing 14. The path of movement of the clamps 25, 26, run between the first brace 18 and the second brace 20.

Figure 3:
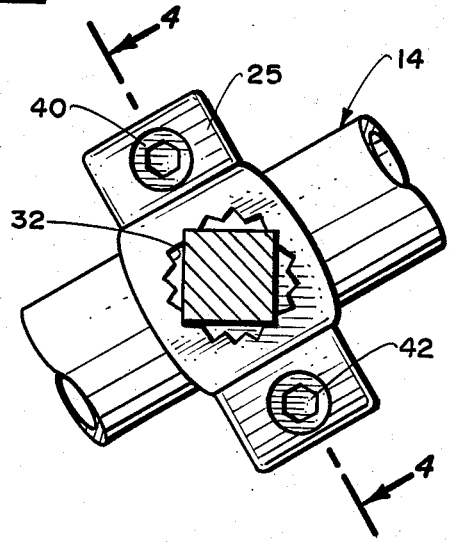
FIG. 3 is a view taken along the lines 3—3 of FIG. 2 showing the adjustable clamp means clamped around the rail guide means.

There is a floorboard 28 positioned outwardly from the rail support means 14. Connecting the floorboard 28 to the clamp means 24 is a bar 30. The outer clamp 25 has a notched recess 32 for receiving one end of the bar 30. As shown in FIG. 3 the notches are analogous to the interior of a socket in that the notches prevent the bar 30 from rotating about its axis. The bar is secured in the notched recess of the exterior clamp by a bolt 44 which threads into the base of the bar 30 and prevents the bar from falling out.

The purpose of this notched recess and bar is to provide for the adjustment of the attitude of the floorboard 28 relative to the motorcycle frame. The other end of the bar is pivotally attached to the floorboard by means of a bolt 50. When the bar 30 is rotated about its axis, the attitude of the face of the floorboard 28 is also caused to be changed.

The bolt 44 can be unscrewed and taken out to allow the end of the bar 30 to disengage itself from the notched recess 32. Upon disengagement, the bar 30 can be rotated about its axis. After the adjustment is completed, the bolt 44 is reinserted into the end of the bar 30 and tightened down.

The pivotal connection between the floorboard 28 and the end of the bar 30 allows the face 29 of the floorboard 28 to be pivoted up and away when not in use. The underneath side of the floorboard 28 has a shelf 52 for preventing the floorboard 28 from pivoting below the bar 30.

Figure 5:
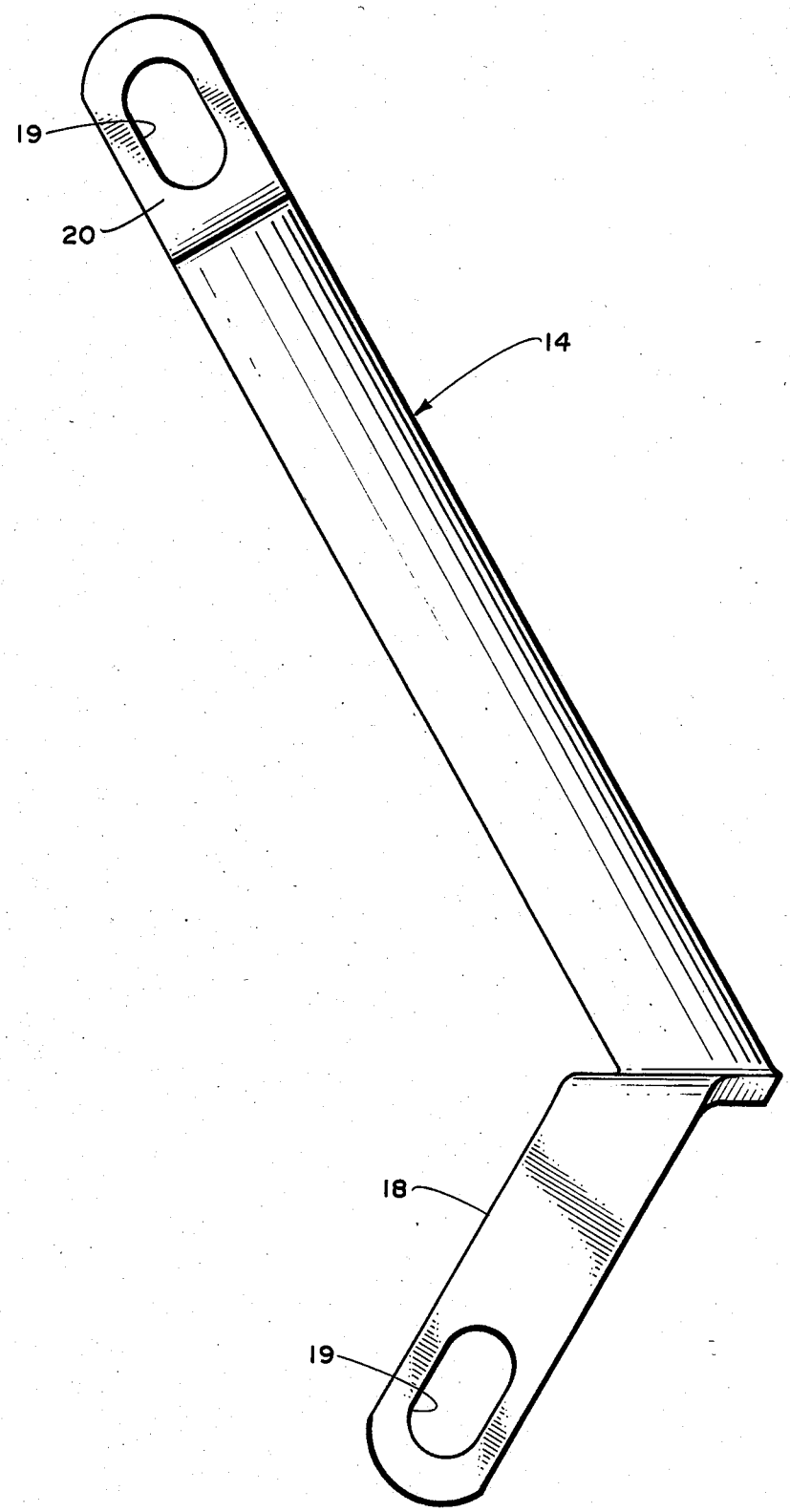
FIG. 5 is a side elevational view of the rail means showing the two braces attached to either end of the rail means.

FIG. 5 is a side elevational view of the rail support means viewed from the side connecting with the motorcycle. The first brace 18 has a bolt slot 19 for allowing the threads of a bolt to pass through for bolting to the frame. The second brace 20 also has bolt slot 19 for the same purpose as provided for by the other slot 19. These slotted bolt holes 19 allow for a limited bolt pattern for attachment to more than one type of motorcycle. In other words, the slotted bolt holes can be adapted to fit on more than one type of motorcycle.

As shown in FIG. 1, the floorboard assembly 10 is bolted to the motorcycle frame such that the tubing 14 is upwardly inclined towards the rear seat. The floorboard 28 is initially adjusted to set the attitude of the board. This is accomplished by rotation of the bar 30 and then securing it into the notched recess 32 of the outer clamp 25. Once this is adjusted and tightened down, the next adjustment is to secure both clamps 25, 26, around the tubing 14 and sliding the clamps to the chosen point on the tubing. This is to set the distance of the floorboard from the passenger seat for the comfort of the passenger. After the position on the tubing is set, the top bolt 40 and bottom bolt 42 are tightened down to prevent slippage of the clamps. The clamps can be adjusted in a continuous fashion anywhere along the length of the tubing 14, or rail support means.

Whereas the present invention has been shown and described herein in what is conceived to be the best mode contemplated, it is recognized that departures may be made therefrom within the scope of the invention which is therefore not to be limited to the details disclosed herein but is to be afforded the full scope of the invention.

What is claimed is:

1. An adjustable passenger floorboard in combination with a motorcycle comprising:

cylindrically shaped rail support means attached at its ends to the frame of a motorcycle and used for supporting said floorboard;

split clamp means extending from said floorboard and attached around and slidable on said rail support means for allowing a continuous adjustment of said floorboard along the track between said ends of said rail support means;

said clamp means includes a rectangular bar pivotally attached at one end to said floorboard and at its other end to said clamp means, said bar positioned in a notched recess in said clamp means for allowing said bar to be rotated about its axis to any of said notches for adjusting the attitude of said floorboard relative to said motorcycle frame;

pivotal means between said floorboard and said clamping means for allowing said floorboard to be folded;

stop means on the bottom of said floorboard for preventing the floorboard from pivoting below said bar whereby adjusting the attitude of said floorboard is accomplished by axially moving said rectangular bar and reinserting said rectangular bar in another notched recess.

2. An adjustable passenger floorboard in combination with a motorcycle comprising:

cylindrically shaped rail support means attached at its ends to the frame of a motorcycle and used for supporting said floorboard;

split clamp means extending from said floorboard and attached around and slidable on said rail support means for allowing a continuous adjustment of said floorboard along the track between said ends of said rail support means;

said clamp means includes a rectangular bar pivotally attached at one end to said floorboard and its other end to said clamp means, said bar positioned in a notched recess in said clamp means for allowing said bar to be rotated about its axis to any of said notches for adjusting the attitude of said floorboard relative to said motorcycle frame;

pivotal means between said floorboard and said clamping means for allowing said floorboard to be folded;

stop means on the bottom of said floorboard for preventing the floorboard from pivoting below said bar;

brace means attached at both ends of said rail support means, said brace means having a slotted bolt hole for allowing attachment to a multiplicity of various types of motorcycle bolt hole patterns, or for adjusting the rake of said rail support means whereby adjusting the attitude of said floorboard is accomplished by axially moving said rectangular bar and reinserting said rectangular bar in another notched recess.

* * * * *